Jan. 27, 1959     T. O. MERRIGAN     2,871,020
DISTRIBUTOR ATTACHMENT FOR WAGON

Filed May 2, 1957     2 Sheets-Sheet 1

INVENTOR.
TIMOTHY O. MERRIGAN
BY Daniel V. O'Keeffe
ATTORNEY

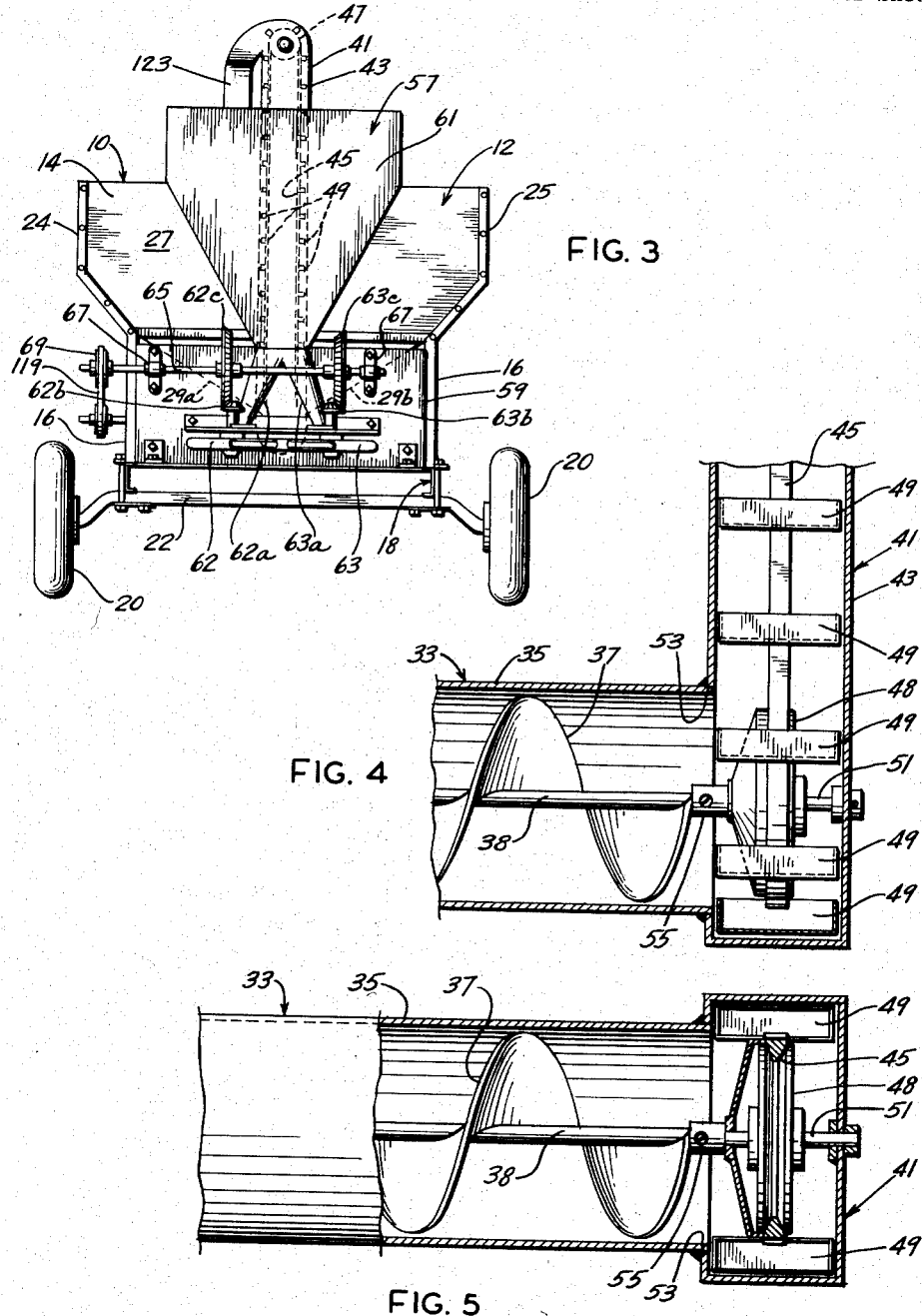

2,871,020

DISTRIBUTOR ATTACHMENT FOR WAGON

Timothy O. Merrigan, Monroe Township,
Turner County, S. Dak.

Application May 2, 1957, Serial No. 656,571

1 Claim. (Cl. 275—2)

This invention relates to seeders, and more specifically, to seeders of the type particularly well adapted to be used as end-gate seeders.

It is a primary object of my invention to provide a novel end-gate seeder, that is, a seeder of the type wherein the seed distributing mechanism may be mounted on the rear end portion of a vehicle, such as a wagon, rearwardly of the rear end wall or end-gate of the vehicle.

End-gate seeders have been heretofore known in the art but have had several inherent disadvantages, such as, for example, requiring manual labor to transfer the seed from a wagon box, or the like, to the seed distributing mechanism; embodying large, cumbersome, or complicated mechanism; not being efficient or reliable in operation, or the like. It is an object of my invention to overcome such disadvantages.

Another object of my invention is to enable seed distributing mechanism to be supplied seed from a source thereof in a novel and expeditious manner.

A further object of my invention is to enable the box of a wagon, or the like, to be entirely emptied of seed through seed distributing mechanism effectively and in a novel manner.

Another object of my invention is to afford a novel seeder wherein seed may be fed from the bottom of a wagon box, or the like, to seed distributing mechanism in a novel and expeditious manner.

Yet another object of my invention is to afford a novel seeder embodying seed distributing mechanism and novel seed storing and conveying mechanism constituted and arranged in a novel and expeditious manner.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 3 is a rear end elevational view;

Fig. 4 is a detail sectional view taken substantially along the line 4—4 in Fig. 2; and Fig. 5 is an enlarged detail sectional view of a portion of the mechanism shown in Fig. 2.

Figure 1:
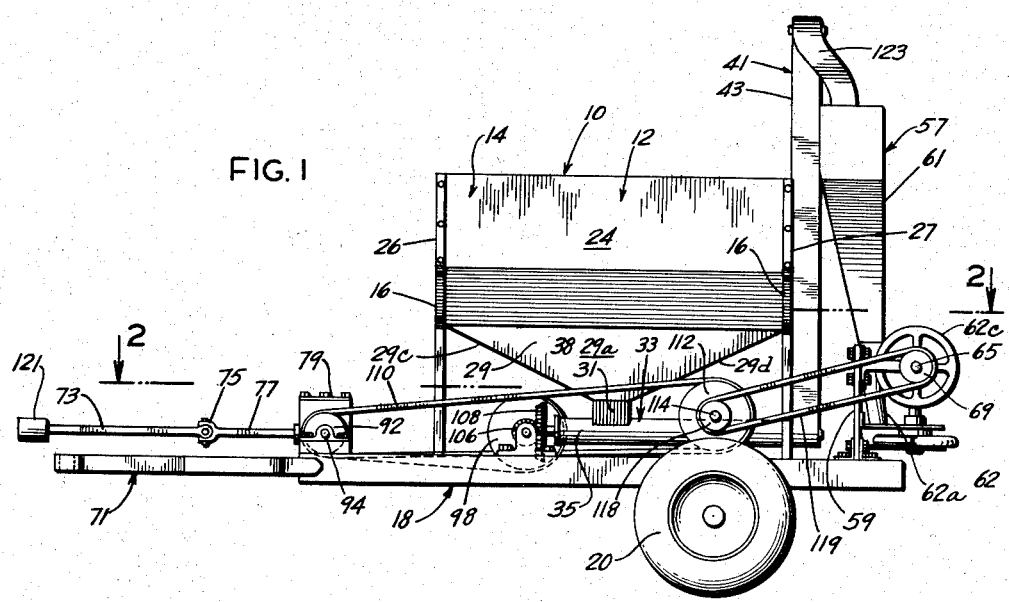
Fig. 1 is a side elevational view of a seeder embodying the principles of my invention.

To illustrate the preferred embodiment of my invention, a seeder 10, embodying the principles of my invention is shown in the drawings.

Figure 2:
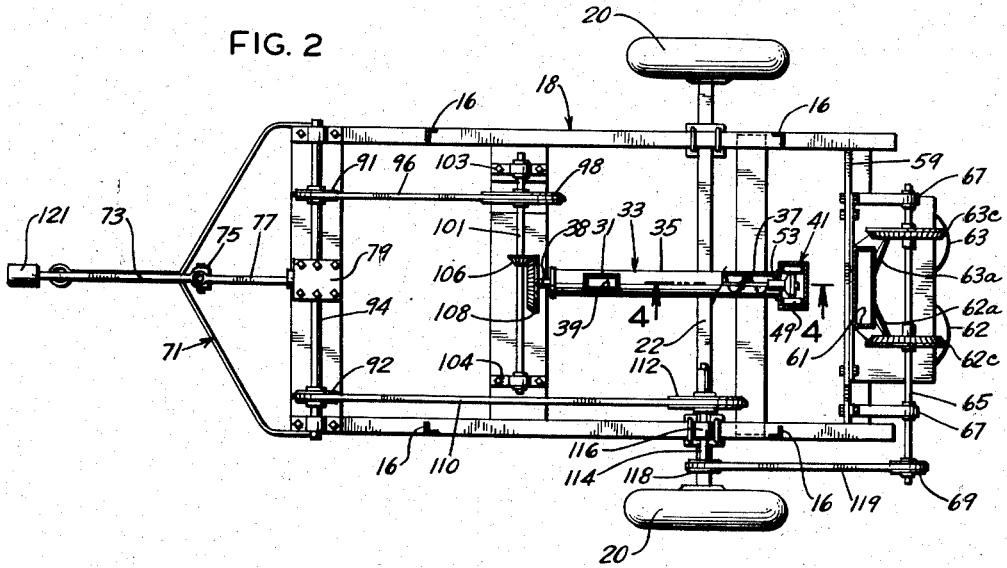
Fig. 2 is a sectional view taken substantially along the line 2—2 in Fig. 1.

The seeder 10 includes a vehicle in the form of a wagon 12, which includes a body or box 14 supported by four corner posts 16 in elevated position on a substantially horizontally disposed supporting frame 18, Figs. 1 and 2. Two wheels 20 are rotatably mounted on an axle 22 which extends beneath the frame 18 and is secured thereto. The axle 22 extends transversely to the length of the wagon 12 beneath the box 14 in such position that the wheels 20 afford effective support for the frame 18 and the box 14, and the vehicle 12 may be readily moved forwardly or rearwardly on the wheels 20 whether the box 14 is loaded or unloaded.

The box 14 includes two side walls 24 and 25, a front end wall 26, and a rear end wall 27, Figs. 1 and 3. It also includes a substantially inverted frusto-pyramidal shaped bottom wall 29. The bottom wall 29 includes two inwardly and downwardly sloping side portions 29a and 29b, and two inwardly and downwardly sloping end portions 29c and 29d, all terminating at their lower edge portions in a downwardly extending discharge chute 31, Figs. 1, 2 and 3.

An elongated screw conveyor 33 is mounted on the vehicle 12 between the box 14 and the frame 18, Figs. 1 and 2. The conveyor 33 includes an elongated tubular casing or housing 35 and a conveyor screw 37, Figs. 2, 4 and 5. A shaft 38 forms part of the conveyor screw 37 and extends longitudinally through the casing 35.

The casing 35 of the conveyor 33 has an opening 39 in the upper face of the forward end portion thereof, which is complementary to the lower end portion of the discharge chute 31 on the bottom wall 29 of the wagon box 14. The casing 35 is secured to the lower end of the chute 31 by suitable means such as, for example, welding, in such position that the lower end of the chute 31 is in direct communication with the opening 39. The rear end portion of the casing 35 is open, Figs. 2, 4 and 5. Hence, it will be seen that, when there is seed in the box 14 and the conveyor 33 is operated, the seed may pass downwardly from the box 14 through the chute 31 and the opening 39 into the front end portion of the casing 35 of the conveyor 33, and be conveyed by the screw 37 longitudinally of the casing 35 and discharged from the rear end portion of the casing 35.

An elevator of the endless-conveyor type is mounted on the rear wall 27 of the box 14 in position to elevate the seed, or the like, from the rear end of the conveyor 33. The elevator 41 includes an elongated housing or casing 43 which is mounted in substantially vertically extending position on the rear wall 27 of the box 14, Figs. 1 and 3. An endless belt 45 is trained over two pulleys 47 and 48 which are journalled in the upper and lower end portions, respectively, of the housing 43, Figs. 3, 4 and 5. A plurality of cups or vanes 49 are mounted on the belt 45 and are movable therewith around pulleys 47 and 48 during operation of the elevator 41.

The lower pulley 48 is secured to a drive shaft 51 which extends therethrough, and which is journalled at one end in the rear face of the housing 43. An inlet opening 53 is formed in the inner or forward face of the housing 43 in longitudinal alignment with a drive shaft 51, Figs. 2, 4 and 5. The opening 53 is complementary in shape and size to the rear end of the casing 35 of the conveyor 33, and the casing 35 is attached to the inner face of the housing 43 by suitable means, such as welding, in longitudinal alignment with the opening 53, Figs. 4 and 5. The inner or forward end portion of the drive shaft 51 is attached to the rear end portion of the shaft 38 of the conveyor 33 by a suitable coupling such as, for example, a collar 55. Hence, it will be seen that upon rotation of the conveyor screws 37 and its associated shaft 38, the pulley 48 will be rotated to thereby drive the belt 45 and the cups 49 and effect operation of the elevator 41.

Seed distributing mechanism 57 is mounted on the frame 18 rearwardly of the elevator 41. The mechanism 57 includes an elongated bracing panel 59 disposed in upright position on the rear end portion of the frame 18, Figs. 1 and 2, and a hopper 61 projecting upwardly above the panel 59, the hopper 61 terminating at its lower end portion below the upper end portion of the elevator 41.

The seed distributing mechanism 57 shown in the drawings is of the type adapted to broadcast seed and includes two rotary distributors 62 and 63, of known construction, connected by two chutes 62a and 63a to the lower end portion of the hopper 61, Figs. 1 and 3. The two rotary distributors 62 and 63 include two bevel gears 62b and 63b, respectively, which are meshed with two drive gears 62c and 63c, respectively, the drive gears 62c and 63c being mounted on and rotatable with a drive shaft 65 journalled in bearings 67 on the rear face of the panel 59, Fig. 3. A drive pulley 69 is mounted on one end of the shaft 65 for rotating the latter and thereby effecting operation of the end distributing mechanism 57 as will be discussed in greater detail presently.

Draft means in the form of a tongue 71, Figs. 1 and 2, are mounted on the front end portion of the frame 18 for connecting the vehicle 12 to a suitable pulling mechanism such as, a tractor, not shown, in trailing relation thereto.

A drive shaft 73 is connected by a universal joint 75 to the drive shaft 77 on the power-input side of a speed-reduction gear unit 79, Figs. 1 and 2. Two pulleys 91 and 92 are mounted on the driven shaft 94 of the reduction gear unit 79. The pulley 91 is connected by a belt 96 to a pulley 98 mounted on a shaft 101 journalled in two bearings 103 and 104 on the frame 18. A bevel gear 106, which is secured to the shaft 101 and is rotatable therewith, is meshed with a bevel gear 108 mounted on the front end portion of the drive shaft 38 of the conveyor 33. Hence, it will be seen that when the drive shaft 73 is rotated to thereby rotate the shaft 77 and the shaft 94, the pulleys 91 and 98, the shaft 101, and the gear 106, are rotated thereby to thereby rotate the conveyor screw 37 of the conveyor 33.

The other pulley 92 on the driven shaft 94 of the reduction gear unit 79 is connected by a belt to a pulley 112 mounted on a shaft 114 which is journalled in a bearing 116 mounted on the frame 18. Another pulley 118 is mounted on the shaft 114 on the other side of the bearing 116, and is rotatable with the shaft 114. The pulley 118 is connected by a belt 119 to the pulley 69 of the seed distributing mechanism 57. Hence, it will be seen that when the drive shaft 73 is rotated to thereby rotate the drive shaft 77 and the driven shaft 94 of the reduction gear unit 79, the pulleys 92 and 112, the shaft 114 and the pulley 118, are rotated to thereby rotate the pulley 69 to thereby effect operation of the rotary distributors 62 and 63 of the seed distributing mechanism 63.

A suitable coupling 121 is mounted on the front end portion of the drive shaft 73 by which the drive shaft 73 may be connected to a suitable source of power such, as for example, the power take-off of a tractor, not shown.

An outlet discharge chute 123 extends from the upper end portion of the housing 43 of the elevator 41 and extends into the upper end portion of the hopper 61 of the seed distributing mechanism 57 for feeding seed, elevated by the belt 45 and cups 49 from conveyor 33 into the upper end portion of the elevator casing 43, into the hopper 61. The seed thus fed into the hopper 61 may pass downwardly through the chutes 62a and 63a to the rotary distributors 62 and 63 from whence it is broadcast in a well known manner during operation of the seeder.

In the operation of my novel seeder 10, the tongue 71 may be connected to a suitable pulling device such as, for example, a tractor, not shown, and the coupling member 121 may be connected to a suitable source of power, such as, for example, the power take-off of the tractor. The box 14 of the vehicle 12 may be filled with seed such as, for example, small grain, and the grain may pass downwardly through the chute 31 into the front end portion of the screw conveyor 33. When the drive shaft 73 is being driven, the conveyor screw 37 of the conveyor 33 is rotated by the gear 108, as previously discussed. This rotation of the conveyor screw 37 is effective to feed seed rearwardly from the chute 31 through the casing 35 of the conveyor 33 into the lower end portion of the elevator 41.

It will be remembered that the elevator 41 is operatively connected by the coupling member 55 to the shaft 38 of the conveyor 33, and, therefore, during operation of the conveyor 33, the elevator 41 is also operated to thereby elevate the seed from the conveyor 33 and discharge it through the chute 123 into the hopper 61 of the seed distributing mechanism 57. The seed passes downwardly through the hopper 61 and the chutes 62a and 63a into the rotary distributors 62 and 63. It will be remembered that the rotary distributors 62 and 63 are connected by the gears 62b, 62c, 63b and 63c and the shaft 65 to the pulley 69, and that the pulley 69 is also driven by the drive shaft 73. Hence, it will be seen that during rotation of the drive shaft 73, both the conveyor 33 and the seed distributing mechanism 57 are driven thereby, and the elevator 41 is driven by the conveyor 33 so that seed may be continuously fed from the box 14 into the feed distributing mechanism 57, from whence it is broadcast, without the necessity of anyone riding on the vehicle 12. Also, it will be seen that with the conveyor 33 of my novel seeder 10 connected to the lower end portion of the substantially frusto-pyramidal shaped bottom wall 29, the entire supply of seed in the box 14 may be readily fed therefrom, without any manual handling thereof.

From the foregoing it will be seen that I have afforded a novel seeder which is effective and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claim.

I claim:

In a seeder including a wagon having a hopper-bottom box, a discharge outlet in the bottom of said box, drive means on the front end of said wagon for connecting said wagon to a tractor having a power take-off in trailing relation thereto, an elongated screw conveyor mounted on and carried by said vehicle below said box, said conveyor having an inlet in the forward end portion and an outlet in the rear end portion, means connecting said inlet to said first named discharge outlet, seed distributing means including a hopper and a distributor mounted on said wagon rearwardly of said box with the inlet of the hopper above said conveyor, an elevator mounted on said wagon between said box and said distributing means in position to elevate seed from said conveyor to said hopper inlet, said outlet of said conveyor being connected to said elevator in position to feed seed from said conveyor into the lower portion of said elevator, said conveyor being operatively connected to said elevator in position to operatively drive said elevator during operation of said conveyor and drive means for operatively connecting said conveyor and said distributor to such a power take-off for simultaneous driving of said conveyor, elevator and distributor by said power take-off.

References Cited in the file of this patent

UNITED STATES PATENTS

| | | |
|---|---|---|
| 2,147,992 | Schau | Feb. 21, 1939 |
| 2,411,056 | Ricketts | Nov. 12, 1946 |
| 2,612,294 | Dorschner | Sept. 30, 1952 |
| 2,619,355 | Trees | Nov. 25, 1952 |